No. 793,209. PATENTED JUNE 20, 1905.
W. C. C. MILLER.
HOSE COUPLING NUT.
APPLICATION FILED OCT. 28, 1904.

2 SHEETS—SHEET 1.

WITNESSES:

INVENTOR
William C. C. Miller
BY
ATTORNEYS

No. 793,209. PATENTED JUNE 27, 1905.
W. C. C. MILLER.
HOSE COUPLING NUT.
APPLICATION FILED OCT. 28, 1904.

2 SHEETS—SHEET 2.

WITNESSES:

INVENTOR
William C. C. Miller
BY
ATTORNEYS

No. 793,209. Patented June 27, 1905.

UNITED STATES PATENT OFFICE.

WILLIAM CASPER CHRISTIAN MILLER, OF VACAVILLE, CALIFORNIA.

HOSE-COUPLING NUT.

SPECIFICATION forming part of Letters Patent No. 793,209, dated June 27, 1905.

Application filed October 28, 1904. Serial No. 230,322.

*To all whom it may concern:*

Be it known that I, WILLIAM CASPER CHRISTIAN MILLER, a citizen of the United States, and a resident of Vacaville, in the county of Solano and State of California, have invented a new and Improved Hose-Coupling Nut, of which the following is a full, clear, and exact description.

The object of this invention is to provide novel details of construction for a hose-coupling nut which adapt it for a speedy and reliable connection of an end of a hose having the nut thereon with the threaded nozzle of a fire-plug or hydrant and also for an instant connection or detachment of two sections of hose, one section having the improved nut on its end and the other section a male-threaded nipple, forming a reliable water-tight joint-coupling between the hose ends that are detachably connected by means of the improvement.

The invention consists in the novel construction and combination of parts, as is hereinafter described, and defined in the claims.

Reference is to be had to the accompanying drawings, forming a part of this specification, in which similar characters of reference indicate corresponding parts in all the figures.

Figure 1:
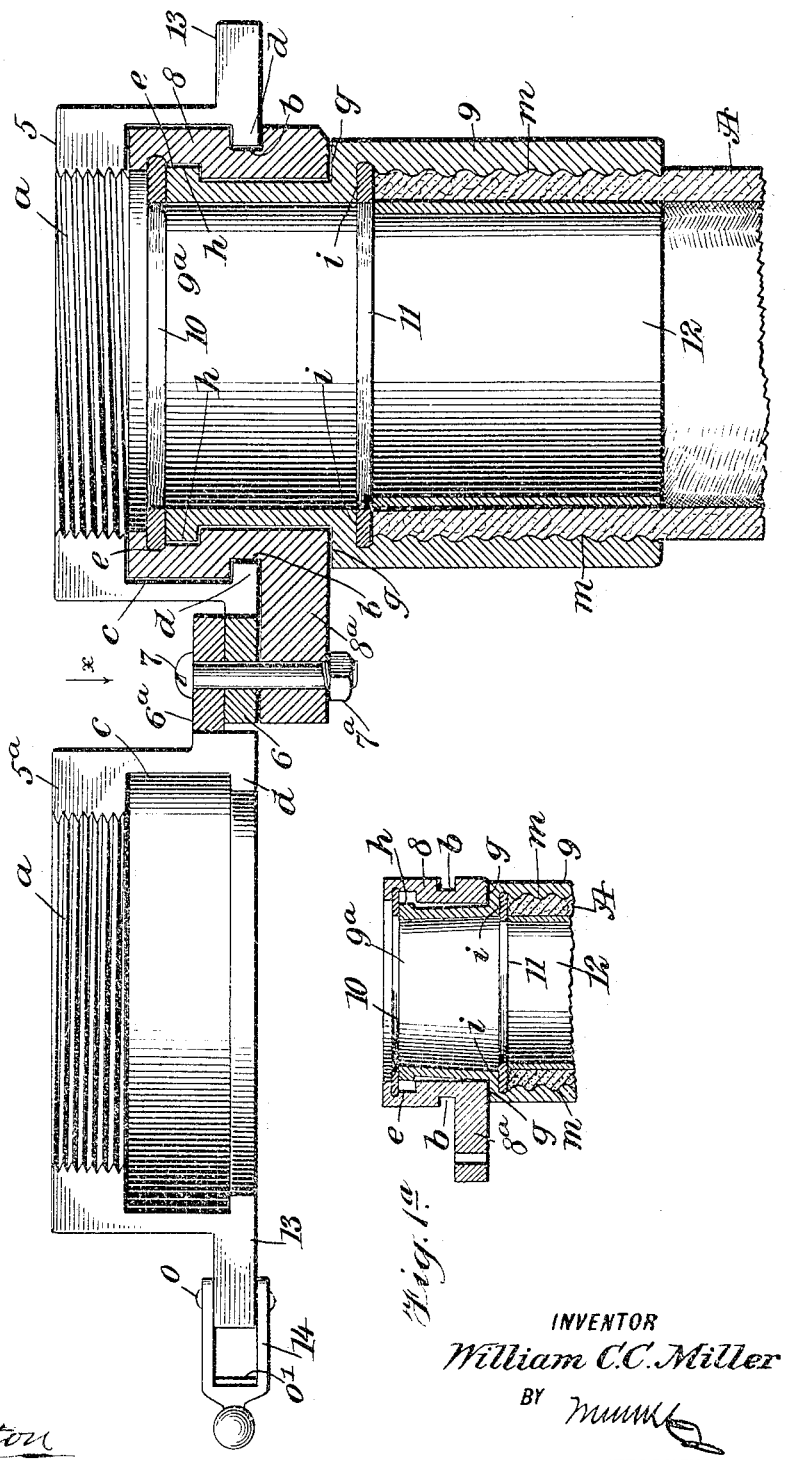
Figure 2:
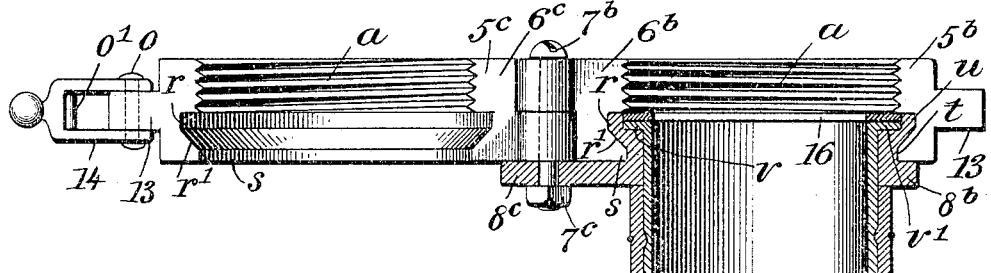
Figure 3:
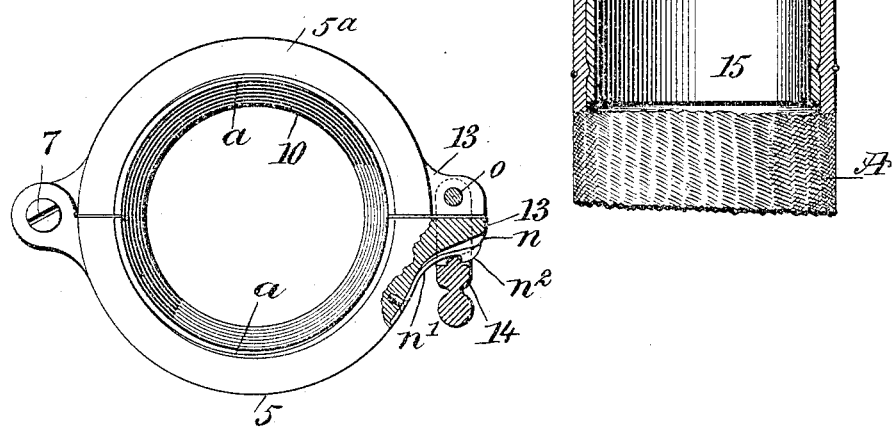
Figure 4:
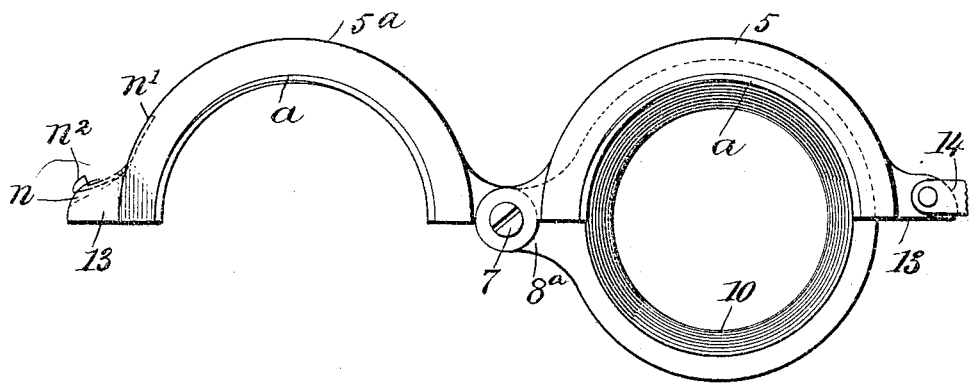

Figure 1 is a partly-sectional side view of the improved hose-coupling nut in opened adjustment, showing a preferred form of construction. Fig. 1ª is a sectional side view of a half-section of the nut-sleeve, illustrating the manner of connecting the sleeve with a swivel-block, these parts being details of the invention. Fig. 2 is a partly-sectional side view of the improved coupling-nut slightly changed in construction. Fig. 3 is a partly-sectional plan view of the coupling-nut in closed condition, and Fig. 4 is a plan view of the same in opened adjustment seen in the direction of the arrow $x$ in Fig. 1.

The improved coupling-nut, as represented in Figs. 1 and 2, consists of two half-sections that are hinged together and internally threaded, as at $a$, forming a complete nut when the sections are closed one against the other. The half-sections 5 5ª of the nut-body (shown in Fig. 1) are jointed together as follows: On the side of each half-section of the nut an ear is formed, the ear 6 on the nut-section 5 projecting laterally at or near the lower end of said section. The similar ear 6ª, which projects from the nut-section 5ª at a point somewhat removed from the lower end of said section, laps upon the upper surface of the ear 6, and said ears are held to rock one on the other by the pivot-bolt 7, that passes through central perforations in said ears.

A swivel-ring 8 is a detail of the invention and consists of a circularly-walled body having a mainly-cylindrical exterior surface, but provided with an ear 8ª, that projects laterally from its lower end. A peripheral groove $b$ is formed in the exterior of the ring 8, having its lower surface flush with the upper surface of the ear 8ª.

A recess $c$ is formed in the two-part body 5 5ª and extends from the lower termination of the thread $a$ to a point near the lower end of the nut-body, leaving an interiorly-projecting flange $d$ remaining intact with the side walls of the nut-sections, and, as shown in Fig. 1, the cylindrical portion of the swivel-ring 8 above the groove $b$ will be embedded within the recess $c$ in each nut-section 5 5ª when the latter are closed, so as to impinge their true flat sides one upon the other. From the relative positions of the groove $b$ and flange $d$ the latter will enter and fill the groove when the half-sections 5 5ª are closed together.

The ear 8ª is impinged upon the lower surface of the ear 6 and is perforated in alinement with the perforations in the ears 6 6ª, so that the pivot-bolt 7 may be inserted therethrough and loosely secured by a nut 7ª, screwed on one end of the bolt.

The inner wall of the swivel-ring 8 is mainly cylindrical, and in said wall above the groove $b$ an annular channel $e$ is formed, as shown in Fig. 1. A sleeve 9 is furnished for the connection of an end of a hose A with the swivel-ring 8, said sleeve being cylindrical in its lower portion. A shoulder $g$ is formed exteriorly on the wall of the sleeve 9 by a reduction in diameter of the portion 9ª that extends above the shoulder. On the upper end portion of the sleeve a peripheral flange $h$ is formed, that is designed to enter the channel

*e* and fit loosely therein. To adapt the upper part 9ª of the sleeve 9 for insertion within the swivel-ring 8, said portion of the sleeve 9 is formed tapering from the shoulder *g* toward the flange *h*, as shown in Fig. 1ª, the taper being just sufficient to permit the free introduction of the sleeve portion 9ª into the ring 8. The sleeve portion 9ª is rendered truly cylindrical by its expansion with a suitable expanding-tool—such, for example, as is commonly employed in expanding the ends of tubes in a flue-sheet for a steam-boiler—the metal composing the sleeve being sufficiently tensile to permit its diametrical enlargement into cylindrical form, as it appears in Fig. 1, wherein the sleeve portion is shown loosely secured in the swivel-ring 8. The channel *e* is preferably widened upwardly for the reception of a suitable washer or joint-ring 10, which in service seats upon the true flat end of the sleeve portion 9ª. Below and near the shoulder *g* the internal diameter of the sleeve 9 is suitably enlarged, forming a flat shoulder *i*, whereon a joint-ring 11 seats, and below the shoulder *i* the inner wall of the sleeve is corrugated, as shown at *m*. An end portion of a hose A of proper diameter is forced into the corrugated bore of the sleeve 9, and to secure such an engagement of the hose a thimble 12 is forced into the hose and expanded by a suitable tool, so that the elastic or pliable body of the hose will be embedded in the corrugations or shallow grooves *m*.

Upon the half-sections 5 5ª of the coupling-nut at points that are diametrically opposite the ears 6 6ª a lug 13 is formed on each half-section. For efficiency in use it is essential that the ears 6 6ª and lugs 13 have straight faces that conform with the meeting walls on the half-sections of the coupling-nut, so that when folded together the nut-sections will form a completed ring, as shown in Fig. 3.

A preferred means for detachably securing the half-sections 5 5ª of the coupling-nut in closed condition consists of the following details: Preferably the outer corner of each lug 13 is rounded, and in the rounded corner of one lug a longitudinally-extended recess *n* is formed. In the recess *n* a spring latch-hook *n'* is secured by one end, so that a latch-nose *n²* on the free outer end of the hook projects slightly outside of the lug, as is shown in Figs. 3 and 4. Upon the other lug 13 a shackle-loop 14 is held to rock, the loop-piece being in the form of a U-shaped bar, having parallel limbs which loosely embrace the parallel top and bottom sides of the lug, whereon the ends of the loop are pivoted, as shown at *o*. A rib *o'* may be formed on the inner transverse wall of the loop 14, and this rib will engage the nose *n²* of the latch-hook *n'* when the coupling-nut sections 5 5ª are closed into ring form upon a nozzle of a fire-plug or a male nipple end on another hose-section, the latching engagement of the hook-nose with the rib *o'* serving to detachably secure the nut-sections together, and a water-tight joint may be instantly effected by a partial rotation of the nut sufficient to enforce the seating of the end of the nozzle or nipple upon the joint-ring 10. To disconnect the coupling-nut from a nozzle or nipple, it is only necessary to release the latch-hook *n'* from the shackle-loop 14 by depressing the hook-nose *n²*, which will permit the swinging adjustment of the shackle-loop away from the lug 13 and the simultaneous opening of the coupling-nut sections, as indicated in Fig. 4.

In Fig. 2 the predominant features of the device are employed, but the construction of parts is somewhat altered. In this example of the invention the half-sections $5^b$ $5^c$ of the two-part coupling-nut have ears $6^b$ $6^c$ thereon, that lap together and are centrally perforated to receive the pivot-bolt $7^b$, that holds the sections free to swing open and closed, the same as is shown in Fig. 1. The swivel-ring $8^b$ in this construction of the coupling-nut is formed with an ear $8^c$, that projects laterally at the lower end of said ring and is pivoted together with the ears $8^b$ $8^c$ by the bolt $7^b$, which passes through the three ears and is held in place by a nut $7^c$. In the inner surface of the half-sections $5^b$ $5^c$ of the coupling-nut an annular groove *r* is formed a short distance from the lower end of the two-part nut, the groove having the lower side thereof beveled, as shown at *r'* in Fig. 2. The formation of the annular groove *r*, as shown and described, leaves a flange *s* remaining at the lower end of the coupling-nut, this annular flange having a beveled upper face. In the outer surface of the swivel-ring $8^b$ a circumferential channel *t* is formed of a shape which adapts it to receive the flange *s*, and as the upper face of this channel is beveled a suitably-shaped annular flange *u* is produced at the upper end of the swivel-ring, which flange is embedded in the groove *r* when the flange *s* seats in the groove or channel *t*. From the construction just described it will be evident that the closure of the sections $5^b$ $5^c$ on the swivel-ring $8^b$ will cause the interlocking flanges on the nut-sections and the swivel-ring to have close contact within the channels they occupy and effect a water-tight joint between said parts. In this construction of the coupling-nut a thimble 15 is provided which fits loosely in the swivel-ring, and at the end which is to be held in said ring a radial flange *v* is formed thereon which seats in a flat-bottomed recess *v'*, formed in the upper end wall of the swivel-ring. Upon the flange *v* a joint-ring or washer 16 is seated, whereon the true end of a hydrant-nozzle or male end of a hose-coupling will seat when the two-part coupling-nut is secured thereon. The thimble 15 extends from the swivel-ring $8^b$ of a length to adapt it to enter a proper distance within the end A of a hose-section, and the exterior of this portion of the thimble is grooved. The hose may be held cramped upon the thimble 15 by a wrapping of wire or by other means.

It is to be understood that the two sections of the coupling-nut shown in Fig. 2 are provided with lugs 13 and the latching device hereinbefore described for holding the nut-sections detachably secured together when applied upon a hydrant-nozzle or a threaded nipple on a hose-section that is to be coupled with the one having the improved nut. The shackle-loop 14 may be held to rock on either lug 13, as shown in Figs. 1, 2, and 4, and the latch-hook be placed on the remaining lug. It is preferred, however, that the shackle-loop be placed as shown in Figs. 1 and 2. The construction of the two-part nut last described may with advantage be used for hose of small diameter, while that shown in Fig. 1 is adapted for general service.

Having fully described my invention, I claim as new and desire to secure by Letters Patent—

1. A coupling-nut comprising two half-sections internally threaded at one end, a swivel-ring held to rotate in the coupling-nut, and a hinge-joint between the nut-sections and the swivel-ring.

2. A coupling-nut comprising two half-sections internally threaded at one end, a swivel-ring held to rotate in the coupling-nut near the thread, ears on the nut-sections and on the swivel-ring, a pivot-bolt passing through these ears, and means for holding the two half-sections closed on the swivel-ring.

3. A coupling-nut comprising two half-sections internally threaded at one end, a swivel-ring held to rotate in the coupling-nut near the thread, ears on the nut-sections and on the swivel-ring, lugs on the nut-sections that fold together when the nut is closed, and means for detachably securing the lugs folded together.

4. A coupling-nut comprising two half-sections internally threaded at one end and laterally recessed therein below the thread, forming an annular inwardly-projected flange at the lower end of the nut, a swivel-ring grooved exteriorly to receive the annular flange and occupying the recess above the groove, means for hingedly connecting the two half-sections of the nut with the swivel-ring, comprising an ear on each nut half-section and on the swivel-ring and a pivot-bolt passing through all the ears, and a latching device for detachably securing the two half-sections closed upon the swivel-ring.

5. A coupling-nut comprising two half-sections that are hinged together and form a ring, an internal thread in the nut at one end, the nut-body having an annular recess in its inner surface, forming an inwardly-extending annular flange at the lower end of the nut, a swivel-ring fitted externally into the annular recess and receiving the annular flange, means for pivoting the swivel-ring upon the two half-sections of the nut, a sleeve held to turn at one end in the swivel-ring, and means for securing the end of a hose in the sleeve.

6. A coupling-nut comprising two half-sections that together form a ring, means for hinging the nut-sections together, said sections having an annular recess in the inner surface forming an inwardly-extended annular flange at the lower end of the nut-body, a swivel-ring hinged upon the nut half-sections, and formed with a circumferential flange at its upper end that occupies the annular recess, said swivel-ring having a circumferential channel therein which receives the annular flange on the nut-sections, a sleeve held to rotate by its upper portion within the swivel-ring, and corrugated in the bore below the swivel-ring, a hose-section inserted in the corrugated bore, a thimble forced in the hose for holding the hose in the sleeve, lugs on the two half-sections, and a latching device on said lugs adapted for holding the two half-sections in contact with each other.

In testimony whereof I have signed my name to this specification in the presence of two subscribing witnesses.

WILLIAM CASPER CHRISTIAN MILLER.

Witnesses:
C. R. BUGBEE,
MARQUIS HIGSON.